No. 871,974. PATENTED NOV. 26, 1907.
W. VERBECK.
FOLDING STEREOSCOPE.
APPLICATION FILED FEB. 6, 1905.
2 SHEETS—SHEET 1.
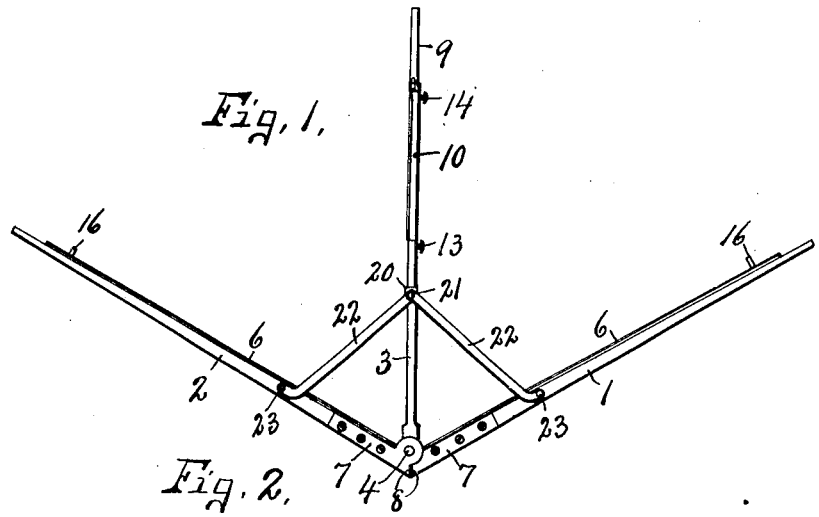
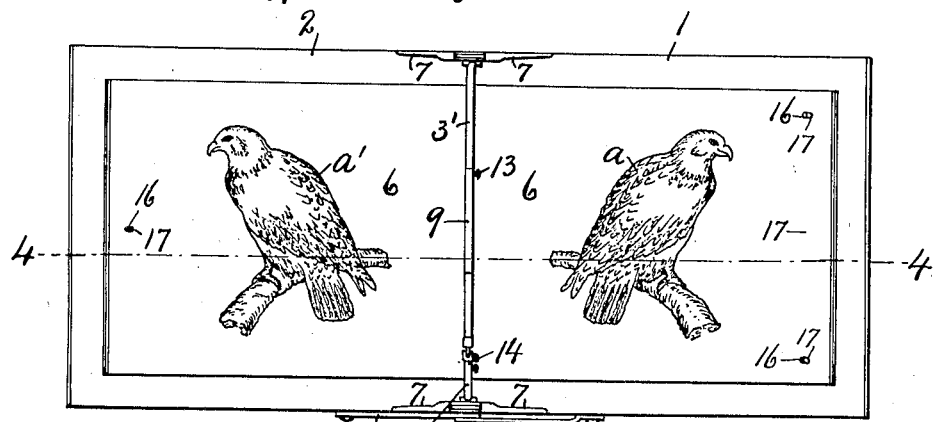
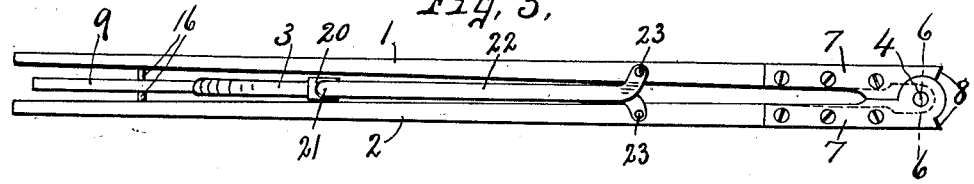
WITNESSES
A. D. Allen
B. E. Robinson.
INVENTOR
William Verbeck
BY
Howard P. Denison
ATTORNEY

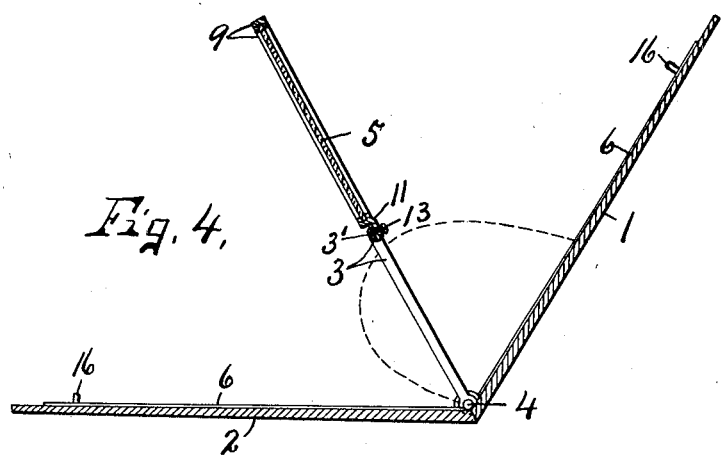
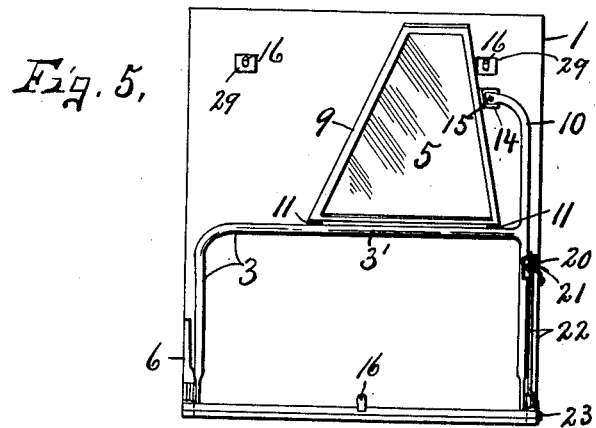
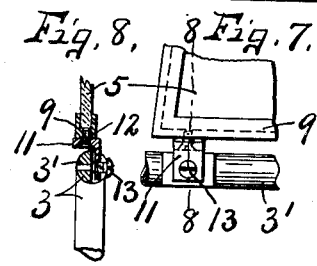
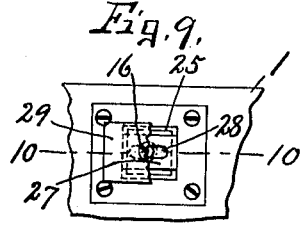
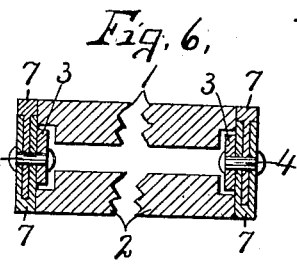
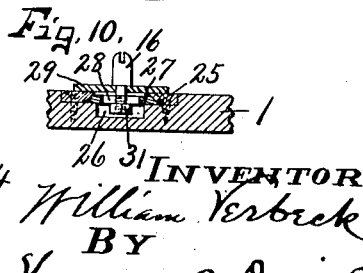

UNITED STATES PATENT OFFICE.

WILLIAM VERBECK, OF MANLIUS, NEW YORK.

FOLDING STEREOSCOPE.

No. 871,974.　　　Specification of Letters Patent.　　　Patented Nov. 26, 1907.

Application filed February 6, 1905. Serial No. 244,371.

*To all whom it may concern:*

Be it known that I, WILLIAM VERBECK, of Manlius, in the county of Onondaga, in the State of New York, have invented new and useful Improvements in Folding Stereoscopes, of which the following, taken in connection with the accompanying drawings, is a full, clear, and exact description.

This invention relates to improvements in stereoscopes and refers more particularly to a folding-stereoscope for viewing pictures of the same object which are taken in reverse order in the manner described in my application No. 206,106, filed May 3, 1904.

My object is to arrange these pictures in book-form with reverse pictures of the same object on opposite pages facing each other and to interpose a light reflecting medium, as a mirror, whereby the reflection of the picture of one page to the eye causes a visual superposition of such picture upon the picture of the opposite page; thus producing a picture of the third dimension, or as seen in binocular vision.

Another object is to produce a new article of manufacture consisting of a folding-stereoscope in book-form with a large field and containing a series of pairs of reverse pictures of the same object, taken from different points of view, as in binocular vision, which pictures are mounted upon suitable leaves, so that when folded or opened, the pictures of each pair face each other, and to include in the folder, a reflector, such as a mirror, which automatically disposes itself in such position that when the eyes are brought into a certain relation with the mirror, one of the pictures is reflected to one eye in such manner as to be visually superimposed upon the opposite picture, which produces the effect of a single picture of the third dimension.

A further object is to provide means for holding the picture leaves in a certain position relative to each other and to the reflecting medium to facilitate the stereoscopic vision or visual superposition of one picture over the other.

A still further object is to provide means for adjusting the mirror in order to further obtain a more perfect stereoscopic view of the object or picture.

Other objects relating to the details of construction will be brought out in the following description.

In the drawings—Figures 1 and 2 are respectively side elevation and a top plan of a folding-stereoscope embodying the features of my invention, the parts being shown in their open position. Fig. 3 is an enlarged edge view of the same device shown in its closed position, or folded position. Fig. 4 is a sectional view taken on line 4—4, Fig. 2, showing the folder in its open position, ready for use. Fig. 5 is an end view of the parts of the folder, as seen in Fig. 4, showing particularly the relative position of the mirror and its supporting frame. Fig. 6 is an enlarged sectional view taken on line 6—6—, Fig. 3, showing particularly the hinge sections between the covers, the central portions of said covers-being broken away. Fig. 7 is an enlarged face view of a portion of the mirror and its supports showing one of the adjusting devices. Fig. 8 is a sectional view taken on line 8—8—, Fig. 7. Fig. 9 is a top plan of a portion of one of the covers showing one of the adjustable holding studs for the leaves. Fig. 10 is a sectional view taken on line 10—10—, Fig. 9.

The invention comprises essentially a stereoscopic apparatus with a large field and having two covers or leaves —1— and —2—, bisected by a mirror-supporting-frame —3—, all of which parts are hinged together at —4—, the frame being adapted to support a mirror in the upper part of the frame—3— and forming with the covers a dihedral angle —5—, while the covers —1— and —2— form opposite panels which receive and support a series of leaves —6—, the whole device constituting a book containing one or more pairs of reverse pictures, as —a— and —a'—, Fig. 2, which pictures are taken from binocular points of view, and are arranged in a folder so as to face each other, and also to face opposite sides of the mirror, one of the panels on the angle, that which faces the back of the mirror carrying the erect stereoscopic view while the other panel opposite the other side of the mirror bears the reverse view.

The covers —1— and —2— may be of any size or material, such as stiff card-board or wood, and may be covered with any suitable material, such as leather, cloth or paper, to add to the neat appearance of the folder, and to provide means for receiving ornamentation or configuration of any description which will further add to the characteristic appearance of the device, although in the drawings I have omitted such ornamental covering in order to render the essential feature of the invention clear and distinct.

Secured to the side edges of the meeting ends of the covers —1— and —2— are suitable metal hinged plates —7— which receive the pivotal pins —4—, whereby the covers —1— and —2— are hinged to each other, the hinge-sections of each pair being provided with abutting faces —8— which limit the opening movement of the covers, but allow said covers to fold together upon opposite sides of the mirror —5— and its supporting frame —3—. The object of these abutments —8—, or equivalent devices is to limit the opening movement of the covers to such a position that when a pair of reverse stereoscopic pictures are placed flatwise upon said covers in a certain position with reference to the mirror, a single stereoscopic picture is seen in its natural binocular appearance without exaggeration. This stereoscopic effect in the single picture may be varied or minimized by gradually folding the covers together while the operator is careful to retain a single vision of the picture, which renders the device very entertaining by reason of the fact that the relief of the picture may be almost obscured when the folder is partially closed and then by gradually opening the book, keeping the eye in a certain position with reference to the mirror so as to maintain the visual superposition of the pictures, this relief is gradually increased as the book is opened until it reaches the maximum with the covers opened to the limit of their movement, or until the abutments —8— are in contact. It is now obvious that by removing these abutments the relief or stereoscopic effects may be further magnified by continuing the opening of the covers, and in some instances I may prefer to make these abutments adjustable so as to allow for this magnified relief in the appearance of the picture, which, of course, would render the device still more attractive and entertaining.

The mirror-supporting-frame —3—, as well as the mirror —5—, are disposed in a plane which practically bisects the angle formed by the folding covers —1— and —2—, and although it is not necessary to have the frame —3— disposed in exactly this plane it is necessary to have the reflecting face of the mirror in such plane and in order to permit the leaves —6— to be turned or folded from one cover to the other in viewing the same pictures of each pair the frame —3 is preferably made in the form of an inverted U— with the ends of its depending arms hinged upon the pivotal pins —4— so that the covers —1— and —2— and frame —3— swing upon the same axis. The opposite depending arms of the U-shape frame —3— are substantially parallel and are spaced a sufficient distance apart to permit the leaves —6— to turn or fold between said arms and below the transverse bar, as —3'—, which unites the upper ends of said arms. In other words, the frame —3— is arched upwardly from the pivotal pins —4— and extends transversely of the covers —1— and —2— in a plane sufficiently above said covers to permit the free end of said leaves —6— to turn or travel under the transverse bar —3'—, it being understood that when the folder is supported in its operative position, as seen in Fig. 4, the cover —1— facing the reflecting side of the mirror —5— is disposed in an inclined plane, and that by merely freeing the free ends of the picture leaves they naturally gravitate or turn under the transverse bar —3'— of the mirror supporting frame —3—, as shown by dotted lines in Fig. 4.

The mirror —5— is mounted in a suitable frame —9—, which in turn, is adjustably secured to the frame —3—. I, preferably carry the mirror frame —9— upon three adjustably supporting points, and for this purpose I provide the frame —3— with an upwardly extending arm —10— which terminates in a plane midway between the lower and upper edges of the mirror-frame —9—.

The lower edge of the mirror-frame —9— is disposed in a substantially horizontal position parallel with the transverse bar —3'— and is provided with suitable brackets —11— which are swiveled by a screw —12— to the lower edge of the frame —9—, there being one of these brackets at each of the lower corners of the mirror-frame. These brackets are in turn provided with threaded apertures for receiving adjusting screws —13— which are journaled in the transverse bar —3'— so that if the mirror should not be in exact adjustment for producing the desired visual effect in superposing one picture upon the other the screws —13— may be turned one way or the other to properly adjust the mirror. In like manner, the upper extremity of the arm —10— is provided with a similar adjusting screw —14— which enters the threaded aperture in the bracket —15— on the upright edge of the mirror-frame —9—, the adjustment being very similar to that described for the lower ends of the frame —9—. It will now be seen that by supporting the frame —9 at three points upon the swiveled brackets, a slight adjustment of either of the screws may take place without liability of breaking the mirror.

The mirror and its supporting frame are of substantially the same or of slightly less length than the covers so that when the covers are folded together, as seen in Fig. 3, the mirror and its supporting frame, together with the book or leaves containing the pictures, are practically inclosed and protected from injury, and the whole device occupies but a very small space.

The leaves —6— upon which the pictures or photographs are printed or mounted are attached to the covers —1— and —2— in such manner that the same points in the reverse pictures are equidistant from and in the same relative position to the mirror in order to obtain an exact visual superposition of one picture upon the other, and in order to make this possible, I provide each cover with one or more projecting studs —16— while the picture leaves —6— are provided with corresponding apertures —17— which receive the studs —16—. For example, I have shown the cover —1— facing the reflecting side of the mirror —5— as provided with a pair of studs —16— which are located near the free end of said cover —1— while the free end of the other cover —2— is provided with a single central stud —16—, and the leaves —6—, which are usually bound together at one end in book-form, have their free ends provided with apertures near their free ends, the two outer apertures receiving the studs —16— on the cover —1— while the center apertures —17— receive the stud on the cover 3.

The mirror —5— and its supporting frame —3— are preferably held midway between the covers as the latter are opened and closed, and for this purpose I provide one of the depending arms of the frame —3— with a sliding cross-head —20— to which are pivotally connected at —21— the adjacent ends of a pair of toggle levers —22— having their lower ends pivoted at —23— to the adjacent edges of the covers —1— and —2— equidistant from the pivotal pins —4—. It now appears that the links —22— are of equal length and being connected at the same point to a sliding cross-head —20— which is engaged with the upright arm of the mirror-supporting frame —3—, whereby said mirror supporting frame will always be held in a plane bisecting the angle formed by the sides and covers —1— and —2— of the holders, as said covers are opened and closed, and therefore, the mirror will always maintain the same position with reference to the leaves when the folder is opened for viewing pictures.

The studs —16— are preferably adjustable, both longitudinally and transversely of the covers to which they are secured, as best seen in Figs. 9 and 10, in which I have shown the cover as provided with a fixed plate having an opening —25— therethrough which registers with a recess —26— in the inner face of the cover. This plate receives a sliding plate —27— which lies in the opening —25—, said sliding plate being itself provided with an elongated slot —28— for receiving the stud —16—. The plate —27— is somewhat narrower than the width of the opening —25— to allow for the sliding movement and the slot —28— is elongated in the opposite direction to permit the stud —16— to be adjusted lengthwise of the slot, and therefore, said stud is adjustable in lines at right angles to each other.

The edges of the plate —27— and opening —25— are preferably beveled so as to hold the plate —27— in position and upon the outer face of the fixed plate is a movable or sliding plate —29— having an aperture for receiving the threaded inner end of the stud —16— which is engaged by the nut —31—, which also engages the under face of the plate —27— so that by unscrewing the stud it may be moved in directions at right angles to each other for proper adjustment, and then retightened to clamp the plate —27— and stud —16— in their adjusted positions.

In the operation of my invention, the device is unfolded and placed upon the table or other support in the position seen in Fig. 4, the book containing the picture leaves being suspended from the studs —16— on the cover —1— so that their lower edges which are loosely bound together are nearly in line with the axis —4— of the swinging covers 5. One of the leaves —6— is now loosened or detached from the studs —16— of the cover —1— and is allowed to turn under the transverse bar —3'— through the frame —3— whereupon its central aperture —17— automatically registers with and receives the central stud —16— on the cover —2—, thereby displaying two reverse pictures, one of which is flatwise against the cover —1— at the reflecting side of the mirror, while the other is displayed flatwise against the cover —2— at the opposite side of the mirror so that the same points in both pictures are now equidistant from the mirror. The operator now places the eyes in somewhat close proximity to the upper edge of the mirror so that the right eye will see only the reflection of the right picture upon the mirror —5— while the left eye will see the left picture and by closely applying the eyes, and at the same time looking with the left eye at the left picture, it will be found that the right-hand picture is visually superimposed upon the left picture, whereupon the observer sees a single picture in stereoscopic relief. In like manner, the operator may turn over one leaf after another to bring different sets of reverse pictures into position to view, and by maintaining the eye in the same relative position to the mirror, and at the same time bringing the covers closely together the relief of the single stereoscopic picture may be varied at will. When not in use, the book of pictures is suspended upon the studs —16— of the cover —1— and the covers are then folded together to inclose and protect the book and mirror.

Having thus described my invention, what I claim and desire to secure by Letters Patent is—

1. In a stereoscope, a stereogram composed of separately movable reverse pictures and supports therefor, in combination with a mirror supported some distance from the stereogram to permit the separate pictures to be moved from side to side between the supports and adjacent edge of the mirror.

2. In a stereoscope, a stereogram composed of separately movable reverse pictures and supports therefor, in combination with a mirror supported some distance from the stereogram to permit the separate pictures to be moved from side to side between the supports and adjacent edge of the mirror, and means to engage and hold the pictures in place upon this support.

3. In a stereoscope, two covers and a mirror frame hinged together on a common axis, a stereogram having separately movable pictures, and a mirror mounted in the frame with its lower edge some distance from the covers for the purpose described.

4. In a stereoscope, the combination of a stereogram and its support, a mirror frame hinged to said support, and a mirror mounted in said frame with its lower edge some distance from the support to form an intervening opening for the adjustment of the stereogram, said stereogram having separate reverse pictures foldable from side to side under the mirror.

5. In a stereoscope, two covers and a mirror frame hinged together on a common axis, a stereogram having separately movable pictures, and a mirror mounted in the frame with its lower edge some distance from the covers for the purpose described, and adjustable means on the covers to engage and hold the pictures in place.

6. In a stereoscope, the combination of a stereogram and its support, a mirror frame hinged to said support, and a mirror mounted in said frame with its lower edge some distance from the support to form an intervening opening for the adjustment of the stereogram, said stereogram having separate reverse pictures foldable from side to side under the mirror and means on the support to hold the stereogram from endwise or lateral displacement.

7. In a folding stereoscope, a mirror supporting frame and a mirror mounted on said frame, in combination with a stereogram having reverse pictures capable of being turned or folded under the mirror.

8. In a folding stereoscope, two stereogram supporting members and a mirror supporting frame all hinged to each other upon a common pivot, and a mirror mounted on said frame.

9. A mirror and support therefor in combination with a stereogram support having each of its sides movable toward and from opposite faces of the mirror.

10. In a folding stereoscope, a mirror and its supporting frame in combination with stereogram supporting members hinged to each other and to the frame and foldable against opposite sides of said frame.

11. In a folding stereoscope, a mirror and its supporting frame, in combination with two folding stereogram supporting members hinged to each other and folding upon opposite faces of the mirror and connections between the frame and said members at one side of the swinging axis of said members.

12. In a folding stereoscope, a stereogram having reverse pictures and separate leaves therefor folding one upon the other, in combination with a mirror supported between said pictures and means to hold the leaves against lateral movement.

13. In a stereoscope, a mirror and its support in combination with a stereogram having reverse pictures movable toward and from opposite faces of the mirror and means for keeping opposite pictures the same distance from opposite faces of the mirror while being folded and unfolded.

14. In a stereoscope, a mirror and its supporting frame, in combination with a folding stereogram support folding toward and from opposite faces of the mirror and means to keep the mirror midway between the folding parts of the stereogram while the latter is being folded and unfolded.

15. In a stereoscope, folding stereogram supports, and a stereogram having reverse pictures, one mounted on each support, in combination with a mirror interposed between said folding supports and means to hold the mirror midway between said supports while the latter are being folded and unfolded.

16. In a folding stereoscope, two folding members hinged to each other, a mirror supporting frame hinged to one of said members, a mirror on the frame, and links having sliding connection with the mirror supporting frame and pivotally connected to said supports.

17. The combination with two stereogram supports hinged to each other, a mirror-supporting frame connected to said supports, a link hinged to one of the supports and having sliding connection with said frame, and a mirror adjustably mounted on the frame.

18. In a folding stereoscope, the combination with two covers hinged to each other, one provided with a stud projecting from its inner face, a mirror and its supporting frame connected to said covers, and a stereogram having apertures for receiving said stud, whereby the stereogram is held in place between the covers.

19. In a folding stereoscope, two folding members hinged to each other, one of the said members being provided with a stud projecting from its inner face, a stereogram consisting of two sheets having reverse pictures provided with apertures for receiving said stud, whereby the stereogram is supported on the inner face of one of the folding members in combination with a mirror supported between said folding members.

20. In a folding stereoscope, two stereogram supporting members hinged to each other, one of said members being provided with means to hold the stereogram, a stereogram consisting of two sheets having reverse pictures detachably supported by said means, a mirror supporting-frame connected to one of said folding members, and a mirror mounted in said frame.

21. A stereoscopic apparatus with a large field and a bisecting mirror and consisting of two panels forming a dihedral angle and between which is arranged a frame or tablet placed in the plane of the bisector of the said angle and bearing on one side of its upper part a mirror, one of the panels of the angle, that which faces the back of the mirror carrying the erect stereoscopic view, while the other panel, opposite the reflecting surface of the mirror bears the reversed view.

In witness whereof I have hereunto set my hand this 28th day of January 1905.

WILLIAM VERBECK.

Witnesses:
MILDRED M. NOTT,
HOWARD P. DENISON.